United States Patent [19]
Allen et al.

[11] Patent Number: 5,668,273
[45] Date of Patent: Sep. 16, 1997

[54] CARBOXYALKYL CELLULOSE ESTERS

[75] Inventors: John Michael Allen; Alan Kent Wilson, both of Kingsport; Paul Lee Lucas, Gray; Larry Gerald Curtis, Johnson City, all of Tenn.

[73] Assignee: Eastman Chemical Company, Kingsport, Tenn.

[21] Appl. No.: 593,781

[22] Filed: Jan. 29, 1996

[51] Int. Cl.$^6$ .................. C08B 13/00; C08L 1/00
[52] U.S. Cl. .................. 536/66; 524/35; 524/37; 524/38; 524/39; 524/40; 524/42; 524/43; 524/44; 524/45; 106/163.01; 106/102.8
[58] Field of Search .................. 536/66; 524/35, 524/37, 38, 39, 40, 42, 43, 44, 45; 106/163.01, 203

[56] References Cited

U.S. PATENT DOCUMENTS

| | | | |
|---|---|---|---|
| 2,912,430 | 11/1959 | Kosche | 536/66 |
| 3,435,027 | 3/1969 | Desmarais et al. | 536/66 |
| 3,789,117 | 1/1974 | Tsujino | 424/35 |
| 4,504,656 | 3/1985 | Omiya | 536/66 |
| 4,520,192 | 5/1985 | Namikoshi | 536/66 |
| 5,008,385 | 4/1991 | Diamantoglou | 536/56 |

FOREIGN PATENT DOCUMENTS

| | | |
|---|---|---|
| 96929 | 4/1989 | Romania . |
| 247440 | 3/1947 | Switzerland . |
| 612933 | 6/1978 | U.S.S.R. . |
| 2284421 | 6/1995 | United Kingdom . |

OTHER PUBLICATIONS

Carbohydrate Research, 13, pp. 83–88, (1970).
Malm, Ind. Eng. Chem., 38 (1946) 77.
Holzforschung, 27(2), pp. 68–70, (1973).

*Primary Examiner*—Nathan M. Nutter
*Attorney, Agent, or Firm*—Bernard J. Graves, Jr.; Rose M. Allen; Harry J. Gwinnell

[57] ABSTRACT

This invention provides certain carboxymethyl cellulose (CMC) esters of higher acids (e.g., CMC acetate propionate, CMC propionate, CMC acetate butyrate, and CMC butyrate). These new ether derivatives of cellulose esters exhibit solubility in a wide range of organic solvents, compatibility with a variety of resins, and ease of dispersion in a water-borne formulation and are useful in coating compositions as binder resins and rheology modifiers.

31 Claims, No Drawings

CARBOXYALKYL CELLULOSE ESTERS

FIELD OF THE INVENTION

This invention belongs to the field of cellulose chemistry. In particular, it relates to certain esters of carboxy(alkyl) cellulose and their use in coating and ink compositions.

BACKGROUND OF THE INVENTION

Cellulose esters are valuable polymers which are useful in many plastic, film, coating and fiber applications. In coatings applications, cellulose esters are generally applied from organic solvent solutions.

U.S. Pat. No. 4,520,192 describes a process for preparing carboxyalkyl acetyl celluloses with a carboxyalkyl degree of substitution per anhydroglucose unit (DS) of 0.2–2.5 and an acetyl DS of 0.5–2.8 and the metal salts of these materials. The preparation of the carboxyalkyl acetyl cellulose is accomplished by converting carboxyalkyl cellulose, sodium salt, into its acid form by soaking in an aqueous acid solution of sulfuric acid, hydrochloric acid, nitric acid, or acetic acid. This is followed by washing with water, solvent exchange of the water with acetic acid, and reaction with acetic anhydride in the presence of a catalyst (sulfuric acid, perchloric acid, sulfoacetic acid or zinc chloride) to give a trisubstituted carboxy acetyl cellulose, i.e., carboxymethyl cellulose acetate, upon precipitation into water. They also claim a process for converting the carboxyalkyl acetyl cellulose product (acid form) to its corresponding sodium, potassium, calcium, or ammonium carboxylate salt. The acid form of the trisubstituted carboxyalkyl acetyl celluloses were insoluble in water and aqueous lower chain alcohol solutions. These materials were soluble in acetone and methylene chloride/ethanol 9/1. The sodium salt of the carboxyalkyl acetyl cellulose was soluble in water, an aqueous lower alkyl alcohol containing a large amount of water, or aqueous acetone; however, it was insoluble in methylene chloride/ethanol 9/1. We believe this process to yield a product containing an unneutralized strong acid with high sulfur levels. Consequently, this ester would be unstable under general drying conditions or other heat treatment. The process for converting the sodium salt form of carboxymethyl cellulose to the acid form is also described in Swiss Patent No. 247,440 by soaking in 10% sulfuric acid solution.

U.S. Pat. No. 3,435,027 describes a base catalyzed (sodium hydroxide) esterification of carboxymethyl cellulose (in the sodium salt form) in 70–85% acetone nonsolvent media with acetic, propionic, lactic, or stearyl anhydride. The procedure yields a product with a low degree of ester substitution and falls well short of a fully substituted cellulose. This reference claims a base catalyzed process for preparing cellulose ether-esters (containing from 0.1–18% acetyl, which corresponds to 0.01–0.97 DS (acetyl) from a water soluble cellulose ether in a nonsolvent media and products thereof.

USSR Patent 612933 describes a process for preparation of cellulose acetate ethers wherein an alkali activated cellulose (12% sodium hydroxide) is etherified with monochloroacetic acid followed by esterification with acetic anhydride in the presence of sulfuric acid catalyst. The process is limited to a low DS of the carboxymethyl substituent.

U.S. Pat. No. 3,789,117 discloses a process for preparing an enteric medicant coating from an organic solvent soluble cellulose derivative. The cellulose derivative's substitution has a carboxymethyl DS range of 0.3 to 1.2 in conjunction with at least one of the remaining hydroxyl groups being etherified or esterified. Ester groups, of which they do not indicate the degree of substitution, include acetyl, propionyl, butyryl, nitric, or higher fatty acids.

RO 96929 describes a carboxymethyl cellulose (CMC) acetate with a carboxymethyl degree of substitution of 0.5–3.0, acetyl DS of 0.4–2.9, and viscosity 150–1500 cP. This material was taught to be useful as an alkaline suspension stabilizer, solution thickener, and alkaline media binder. The material was prepared by mixing 70% acetic acid with CMC(Na salt), washing the acetic wet CMC with 50% acetic acid to remove the sodium acetate, and esterification of the acetic acid wet CMC-H with acetic anhydride for 1.5 hours at 50°–110° C. in the presence of sulfuric acid.

U.S. Pat. No. 5,008,385 reports cellulose derivatives that can be synthesized by homogeneous reaction in dimethylacetamide and/or N-methylpyrrolidine containing LiCl. Included in their examples was CMC acetate (carboxymethyl DS 0.13–0.23, acetyl DS 2.54–2.15). These materials were tested for use in the production of fibers, filaments, or membranes.

Carbohydrate Research, 13, pp.83–88, (1970) describes the preparation of CMC acetate by sulfuric acid catalyzed acetylation of CMC (carboxymethyl DS of 0.07) hydrolysis (acetylation and hydrolysis procedures taken from Malm, Ind. Eng. Chem., 38 (1946) 77), and evaluation of this material in membranes for reverse osmosis.

Holzforschung, 27(2), pp. 68–70, (1973) describes the rate of carboxymethylation and deacetylation of cellulose acetate in the presence of sodium hydroxide. This work showed that deacetylation and carboxymethylation occur simultaneously with the rate of deacetylation being faster than the rate of carboxymethylation. The highest carboxymethyl DS obtained was less than 0.1.

GB 2,284,421 discloses carboxymethyl cellulose alkanoates which are "lightly carboxymethylated", i.e., having a degree of substitution per anhydroglucose unit of less than 0.2. Such polymers are taught to be useful as a coating agent for paper and papermaking or as a bonding agent for non-woven fabric, or can be extruded to form filaments or film, or can be used to produce shaped articles or a sponge.

SUMMARY OF THE INVENTION

This invention provides ether-ester derivatives of cellulose which combines a carboxyalkyl ether (preferably carboxymethyl) substituent and propionyl, acetyl/propionyl, butyryl, or acetyl/butyryl ester substituents. These new carboxymethyl cellulose esters (CMC esters) have a high combined degree of substitution (DS) per anhydroglucose unit on the cellulose backbone of ether and ester functions in the trisubstituted or partially hydrolyzed form (generally <0.70 DS hydroxyl). These new CMC esters are soluble in a wide range of organic solvents which allows coating formulators a wider latitude of solvent choice. They are readily dispersed in waterborne formulations when treated with ammonia or an amine and exhibit unusual rheological properties illustrated by an exponential increase in viscosity with a small increase in concentration of CMC ester. This is thus beneficial in waterborne coatings. These materials exhibit superior compatibility when blended with other coating resins thereby yielding clear films with a wider range of coatings resins than do conventional cellulose esters.

DETAILED DESCRIPTION OF THE INVENTION

The present invention provides certain esters of carboxy ($C_1$–$C_3$ alkyl) cellulose, which are useful as binder components of coating compositions. Such esters preferably have an inherent viscosity of 0.20 to 0.70 dL/g, preferably 0.35 to 0.60 dL/g, as measured in a 60/40 (wt./wt.) solution of phenol/tetrachloroethane at 25° C., a degree of substitution per anhydroglycose unit of carboxy($C_1$–$C_3$ alkyl) of about 0.20 to 0.75, and a degree of substitution per anhydroglucose unit of $C_2$–$C_4$ esters of about 1.5 to about 2.7. As is described below, these resins are useful in coating and ink formulations. Certain particular novel esters are preferred and further provided as additional embodiments of this invention as follows.

In one such embodiment of the present invention, there is provided a carboxymethyl cellulose butyrate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 0.70 dL/g, as measured in a 60/40 (wt./wt.) solution of phenol/tetrachloroethane at 25° C. It is preferred that the inherent viscosity be 0.35 to 0.60 dL/g.

As a further preferred embodiment, there is provided a carboxymethyl cellulose propionate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 0.70 dL/g, as measured in a 60/40 (wt./wt.) solution of phenol/tetrachloroethane at 25° C. It is preferred that the inherent viscosity be 0.35 to 0.60 dL/g.

As a further embodiment, there is provided a carboxymethyl cellulose acetate butyrate having a degree of substitution of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65, and having an inherent viscosity of 0.20 to 0.70 dL/g, as measured in a 60/40 (wt./wt.) solution of phenol/tetrachloroethane at 25° C. It is preferred that the inherent viscosity be 0.35 to 0.60 dL/g. It is preferred that the degree of substitution per anhydroglucose unit of hydroxyl is 0.10 to 0.70, butyryl is 1.10 to 2.55, and acetyl is 0.10 to 0.90.

As a further embodiment, there is provided a carboxymethyl cellulose acetate propionate having a degree of substitution per anhydroglucose unit of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of propionyl of about 0.10 to 2.60 and a degree of substitution per anhydroglucose unit of acetyl of about 0.10 to 2.65, and having an inherent viscosity of 0.20 to 0.70 dL/g, as measured in a 60/40 (wt./wt.) solution of phenol/ tetrachloroethane at 25° C. It is preferred that the inherent viscosity be 0.35 to 0.60 dL/g. It is preferred that the degree of substitution per anhydroglucose unit of hydroxyl is 0.10 to 0.70, butyryl is 1.10 to 2.55, and acetyl is 0.10 to 0.90.

The carboxy($C_1$–$C_3$)alkyl cellulose esters of the invention may be prepared by a multi-step process. In this process, the free acid form of, for example, carboxymethyl cellulose is water activated followed by water displacement via solvent exchange with an alkanoic acid such as acetic acid followed by treatment with a higher aliphatic acid (propionic acid or butyric acid) to give a carboxymethyl cellulose (CMC-H) activate wet with the appropriate aliphatic acid. In this regard, we have found that it is of critical importance that the starting carboxymethyl cellulose be prepared from cellulose with a 95 to 99% alpha content, preferably about 96 to 97% alpha cellulose content. The high alpha content is important for the quality of the final products prepared therefrom. We have found that low alpha cellulose pulps lead to poor solubility in organic solvents and consequently poor formulations.

Next, the CMC-H is treated with the desired anhydride in the presence of a strong acid catalyst such as sulfuric acid to give a fully substituted CMC ester. A final solution (consisting of water and an aliphatic acid) is added slowly to the anhydrous "dope" solution so as to allow removal of combined sulfur from the cellulose backbone. The final addition allows a slow transition through the hydrous point to give period of low water concentration and high temperature (as a result of the exotherm from water reacting with excess anhydride) in the reaction medium. This is crucial for hydrolysis of combined sulfur from the cellulose backbone. This product is then hydrolyzed using sulfuric acid to provide a partially substituted carboxymethyl cellulose ester. Hydrolysis is necessary to provide gel free solutions in organic solvents and to provide better compatibility with other resins in coatings applications.

Next, the sulfuric acid is neutralized after the esterification or hydrolysis reactions are complete by addition of a stoichiometric amount of an alkali or alkaline earth metal alkanoate, for example, magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of carboxy($C_1$–$C_3$ alkyl) cellulose ester are isolated by diluting the final neutralized "dope" with an equal volume of acetic acid followed by precipitation of the diluted "dope" into a volume of water about 1.5 to 3.0 times its weight. This is followed by addition of 1.5 to 3.0 volumes of water to give a particle that can be easily washed with deionized water to efficiently remove residual organic acids and inorganic salts.

Thus, as a further aspect of the invention, there is provided a process for preparing $C_2$–$C_4$ esters of carboxy ($C_1$–$C_3$ alkyl) cellulose having an inherent viscosity of about 0.2 to 0.70 dL/g, as measured in a 60/40 (wt./wt.) solution of phenol/tetrachloroethane at 25° C., and having a degree of substitution per anhydroglucose unit (DS/AGU) of carboxy ($C_1$–$C_3$ alkyl) of about 0.20 to 0.75, which comprises:

(a) slurrying water wet carboxy($C_1$–$C_3$ alkyl) cellulose (acid form) in a solvent selected from the group consisting of acetic acid, propionic acid, and butyric acid, and mixtures thereof, thereby dewatering said carboxy ($C_1$–$C_3$ alkyl) cellulose to form a mixture; followed by (b) treating said mixture with a compound selected from the group consisting of acetic anhydride, propionic anhydride, and butyric anhydride, and mixtures thereof, in the presence of a strong acid catalyst; followed by (c) heating at a temperature of about 40° to 55° C. until the reaction is complete, i.e., after complete dissolution of material; followed by (d) adding slowly a mixture of water, an alkanoic acid and optionally an amount of a $C_2$–$C_5$ alkanoic acid salt of an alkali or alkaline earth metal insufficient to totally neutralize the strong acid catalyst;

(e) heating said solution at a temperature of about 55° to 85° C. for about 1 to 15 hours, which effects partial hydrolysis of the carboxy($C_1$–$C_3$ alkyl) cellulose alkanoic ester;

(f) treating said solution with an equimolar amount, based on the amount of strong acid catalyst, of a $C_2$–$C_5$ alkanoic salt of an alkali or alkaline earth metal dissolved in water and an alkanoic acid.

As a preferred embodiment of this process, the reaction mixture is diluted with an equal volume of acetic acid, followed by precipitation of the diluted product into a volume of water about 1.5 to 3.0 times its weight, followed by an additional volume of water about 1.5 to 3.0 times its weight, washed with deionized water and dried to provide the desired product as a powder. This powder is thus free from any significant amount of residual organic acids and inorganic salts.

Contrary to the teaching in GB 2,284,421, the carboxyalkyl cellulose as obtained from alkylation is not suitable for esterification. We have found that it must be converted to the acid form, water activated, and solvent exchanged with an alkanoic acid before esterification will occur. Also contrary to this reference, we have found that carboxyalkyl celluloses having a degree of substitution of about 0.2 to 0.75 are actually less reactive than the original cellulose and thus heat must be utilized to effect esterification.

Cellulose esters have found utility in pigment dispersions by blending the cellulose ester and a pigment with heat and/or shear to disperse the pigment. In this manner, pigments can be easily dispersed in coating formulations, thereby providing high coloring power and good transparency while using a minimal amount of pigment. Such pigment dispersions can be improved by the use of the carboxy($C_1$–$C_3$ alkyl) cellulose esters of the present invention in place of conventional cellulose esters. We have found that the carboxy($C_1$–$C_3$ alkyl) cellulose esters of the present invention impart markedly improved wetting properties to the pigment dispersion. Mixtures of $C_2$–$C_4$ esters of carboxy ($C_1$–$C_3$)alkyl cellulose and pigments at a pigment: $C_2$–$C_4$ esters of carboxy($C_1$–$C_3$)alkyl cellulose weight ratios of about 20:80 to 50:50 may be prepared. These dispersions can be prepared on a two-roll mill or in a ball mill, Kady mill, sand mill, and the like.

Thus, the present invention provides a pigment dispersion comprising about 20 to 50 weight percent by weight of a pigment and correspondingly about 50 to 80 percent by weight of a $C_2$–$C_4$ ester of carboxy($C_1$–$C_3$)alkyl cellulose having an inherent viscosity of about 0.2 to 0.70 dL/g, as measured in a 60/40 (wt./wt.) solution of phenol/ tetrachloroethane at 25° C., a degree of substitution per anhydroglucose unit of carboxy($C_1$–$C_3$)alkyl of about 0.2 to about 0.70, and a degree of substitution per anhydroglucose unit of $C_2$–$C_4$ esters of about 1.5 to about 2.7.

The above polymers are easily formulated into either lacquer or enamel type coatings where they are used as rheology modifiers and/or binder components providing improved aluminum flake orientation and improved hardness. They can be applied to a substrate in the form of an organic solvent solution, an amine neutralized waterborne dispersion, a fully neutralized aqueous/organic colloidal dispersion, or as a zero VOC dispersion in aqueous ammonia. They can provide a water clear, high gloss, protective coating for a variety of substrates, especially metal and wood.

Carboxymethyl cellulose esters of this invention, i.e., CMC propionate, CMC acetate propionate, CMC butyrate, and CMC acetate butyrate, as described above, exhibit improved solubility and compatibility (i.e., film clarity) characteristics over carboxymethyl cellulose acetate or conventional cellulose esters (cellulose acetate, cellulose propionate, cellulose butyrate, cellulose acetate propionate, or cellulose acetate butyrate). These esters are soluble in most classes of typical coating solvents including ketones, esters, alcohols, glycol ethers, and glycol ether esters, while tolerating dilution with water or aromatic hydrocarbons. Examples of typical solvents include acetone, methyl ethyl ketone, methyl isobutyl ketone, methyl amyl ketone, methyl isoamyl ketone, 2-propoxyethanol, 2-butoxyethanol, ethyl 3-ethoxypropionate, ethanol, propanol, isopropyl alcohol, butanol, 2-ethylhexanol, ethyl acetate, propyl acetate, isopropyl acetate, butyl acetate, isobutyl acetate, ethylene glycol diacetate, and other volatile inert solvents typically used in coating compositions. For example, organic solutions of the esters of this invention can be prepared by adding 1 to 1000 parts of solvent per part of ester; 1.5 to 9 parts of solvent per part of ester is preferred.

The $C_2$–$C_4$ esters of carboxy($C_1$–$C_3$)alkyl cellulose of this invention are useful as rheology modifiers. At low concentrations (<5 weight percent on total formulation) amine neutralized waterborne dispersions have shown exponential viscosity changes with changes of as little as 0.5 weight percent concentration of the $C_2$–$C_4$ esters of carboxy ($C_1$–$C_3$)alkyl cellulose. This rapid viscosity build is especially useful in the reduction of runs and sags in waterborne spray applications.

Further, the esters of the present invention are relatively hard polymers, i.e., about 12 Knoop Hardness Units (KHU), and have high glass transition temperatures. They can be added to other resins to improve the coating hardness and to improve properties such as slip, sag resistance, and mar resistance. To further improve the toughness, crosslinkers such as melamines or isocyanates may be added to react with these esters or with other resins.

The esters of the present invention possess free hydroxyl groups and thus can also be utilized in conjunction with crosslinking agents such as melamines and isocyanates. Such melamines are preferably a compounds having a plurality of —N(CH$_2$OR)$_2$ functional groups, wherein R is $C_1$–$C_4$ alkyl, preferably methyl. In general, the melamine cross-linking agent may be selected from compounds of the following formulae, wherein R is independently $C_1$–$C_4$ alkyl:

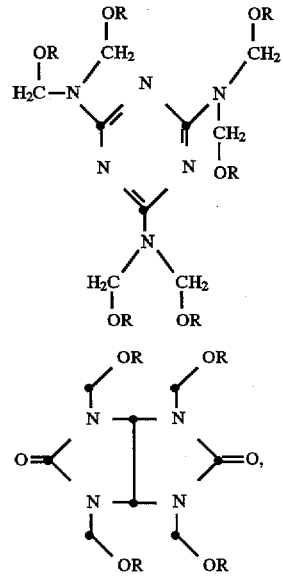

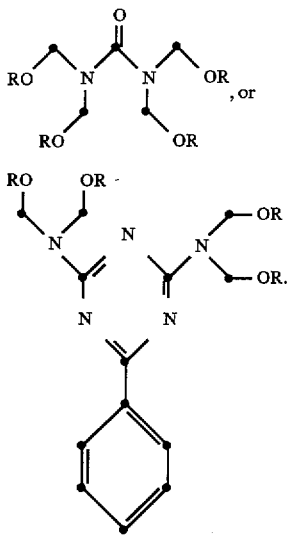

In this regard, preferred cross-linking agents include hexamethoxymethylamine, tetramethoxymethylbenzoguanamine, tetramethoxymethylurea, mixed butoxy/methoxy substituted melamines, and the like. The most preferred melamine cross-linking agent is hexamethoxymethylamine.

Typical isocyanate crosslinking agents and resin include hexamethylene diisocyanate (HMDI), isophorone diisocyanate (IPDI), and toluene diisocyanate.

Since there are free —COOH groups present on the esters of the present invention, one could use the usual crosslinkers and resins used with carboxyl functional resins, e.g., epoxy resins or glycidyl-functional resins. Preferred epoxy functional resins generally have a molecular weight of about 300 to about 4000, and have approximately 0.05 to about 0.99, epoxy groups per 100 g of resin (i.e., 100–2000 weight per epoxy (WPE)). Such resins are widely known and are commercially-available under the EPON® trademark of the Shell Chemical Company, the ARALDITE® trademark of CIBA-Geigy, and D.E.R. resins of the Dow Chemical Company.

The esters of the present invention with a range of acid numbers from about 40 to 130, hydroxyl levels of about 0.15 (essentially trisubstituted, i.e, no or little hydrolysis), 0.25, and 0.5 DS were evaluated for their compatibility with alkyd and polyisocyanate resins and compared with nitrocellulose, and the commercially available celluluose acetate butyrates, CAB 381-0.5 and CAB 551-0.2, available from Eastman Chemical Company. Methyl isobutyl ketone was used as the solvent. Solutions which were hazy had isopropyl alcohol added to clear up the haze (except for the solutions containing Desmondur HL polyisocyanate resin). Generally better film clarity was noted with increasing acid number of the CMC ester. As expected, the conventional CABs (cellulose acetate butyrates) showed very hazy films with the alkyd. The best film clarity of the CMC esters was with 90 and 120 acid number CMC butyrates. In general, an increase in hydroxyl number of the CMC ester also increased the film clarity, but this effect was much less than the effect of the acid number. Adding acetyl to the CMC ester generally decreased the film clarity with the samples tested. The solutions of these materials with the polyisocyanate resin were prepared without any catalyst for the crosslinking reaction; however, apparently the carboxymethyl group was a strong enough acid to catalyze the reaction since the solutions with CMC esters with acid numbers above 40 gelled at cellulosic to modifier ratios of 1:1 and 3:1 before films could be cast (24 hours or less). Also the higher the acid number of the ester the faster the rate of gelation (with the 120 acid number samples no films were cast except for the trisubstituted samples at the 1:9 ratio). The film clarity was much less sensitive to acid number than with the alkyd resins with clear films being obtained with most of the samples with acid numbers above 40 (the 60 acid number trisubstituted sample was the exception to this). The addition of acetyl did not seem to decrease the film clarity with this resin.

Thus, the present invention provides a coating composition comprising (a) about 0.1 to about 50 weight percent, based on the total weight (a) and (b) in said composition, of a $C_2$–$C_4$ ester of carboxy($C_1$–$C_3$)alkylcellulose, an inherent viscosity of about 0.20 to 0.70 dL/g, as measured in a 60/40 (wt./wt.) solution of phenol/tetra-chloroethane at 25° C., a degree of substitution per anhydroglucose unit of carboxy($C_1$–$C_3$)alkyl of greater than 0.2 to about 0.75, and a degree of substitution per anhydroglucose unit of $C_2$–$C_4$ esters of about 1.5 to about 2.70;

(b) about 0.1 to 50 weight percent, based on the total weight of (a) and (b) in said composition, of a resin selected from the group consisting of polyesters, polyester-amides, cellulose esters, alkyds, polyurethanes, epoxy resins, polyamides, acrylics, vinyl polymers, polyisocyanates, and melamines; and (c) an organic solvent or solvent mixture;

wherein the total weight of (a) and (b) is about 5 to 70 weight percent of the total weight of (a), (b), and (c).

In the compositions of the invention, the total weight of a), b),and c) will of course equal 100%.

As noted above, the esters of the present invention may also be utilized in waterborne coating compositions. The esters of this invention may be dissolved in organic solvents, partially neutralized, and dispersed in water. Examples of such solvents include but are not limited to 2-butanone, methyl amyl ketone, methanol, ethanol, ethyl 3-ethoxypropionate, ethylene glycol monoethyl ether, ethylene glycol monopropyl ether, and ethylene glycol monobutyl ether and the like. Dispersion of the modified cellulose ester of the present invention in water requires about 25 to about 100% neutralization of the pendant carboxylate groups with an amine. Typical amines include but are not limited to ammonia, piperidine, 4-ethylmorpholine, diethanolamine, triethanolamine, ethanolamine, tributylamine, dibutylamine, and dimethylamino ethanol.

The amount of suitable aqueous solvent in the dispersed coating composition of the present invention is 50 to about 90 wt %, preferably about 75 to about 90 wt % of the total coating composition.

Thus, as a further aspect of the present invention, there is provided a waterborne coating composition comprising (a) about 0.1 to about 50 weight percent, based on the total weight of (a) and (b), of a $C_2$–$C_4$ ester of carboxy ($C_1$–$C_3$)alkylcellulose, an inherent viscosity of about 0.20 to 0.70 dL/g, as measured in a 60/40 (wt./wt.) solution of phenol/tetrachloroethane at 25° C., a degree of substitution per anhydroglucose unit of carboxy ($C_1$–$C_3$)alkyl of greater than about 0.20 to about 0.75, and a degree of substitution per anhydroglucose unit of $C_2$–$C_4$ esters of about 1.50 to about 2.70; wherein at least about 25 percent of all free carboxyl groups on said $C_2$–$C_4$ ester of carboxy($C_1$–$C_3$)alkylcellulose have been neutralized with ammonia or an amine;

(b) at least 50 weight percent, based on the total weight of (a) and (b), of a compatible water soluble or water dispersible resin selected from the group consisting of polyesters, polyesteramides, cellulose esters, alkyds, polyurethanes, epoxy resins, polyamides, acrylics, vinyl polymers, polyurethanes, and melamines;

(c) water;

(d) an organic solvent;

wherein the total weight of (a) and (b) is between 5 and 50 weight percent of the total composition and the organic solvent comprises less than 20 weight percent of the total weight of the composition.

As a further aspect of the present invention, the above compositions are further comprised of one or more coatings additives. Such additives are generally present in a range of about 0.1 to 15 weight percent, based on the total weight of the composition. Examples of such coatings additives include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID®; polypropylene, available from Hercules Inc., under the trademark HERCOFLAT®; synthetic silicate, available from J. M Huber Corporation under the trademark ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK® trademark of BYK Chemie, U.S.A., under the FOAMASTER® and NOPCO® trademarks of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademark of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

To prepare the coated articles of the present invention, the formulated coating composition containing carboxy($C_1$–$C_3$ alkyl) cellulose esters of the present invention is applied to a substrate and allowed to air dry. The substrate can be, for example, wood; plastic; metal such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

Pigments suitable for use in the coating compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

Experimental Section

The $^1$H NMR results were obtained using a JEOL Model GX-270 NMR spectrometer operated at 270 MHz. Sample tube size was 5 mm. The sample temperature was 80° C., the pulse delay 5 sec. and 64 scans were acquired for each experiment. Chemical shifts are reported in ppm from tetramethylsilane, with residual DMSO as an internal reference. The chemical shift of residual DMSO was set to 2.49 ppm.

The acid number of the carboxy($C_1$–$C_3$)alkyl cellulose ester was determined by titration as follows. An accurately weighted aliquot (0.5–1.0 g) of the carboxy($C_1$–$C_3$)alkyl cellulose ester was mixed with 50 mL of pyridine and stirred. To this mixture was added 40 mL of acetone followed by stirring. Finally, 20 mL of water was added and the mixture stirred again. This mixture was titrated with 0.1N sodium hydroxide in water using a glass/combination electrode. A blank consisting of 50 mL pyridine, 40 mL of acetone and 20 mL water was also titrated. The acid number was calculated as follows where.

Ep=mL NaOH solution to reach end point of sample

B=mL NaOH solution to reach end point of blank

N=normality of sodium hydroxide solution

Wt.=weight of carboxy($C_1$–$C_3$)alkyl cellulose ester titrated

Acid Number (mg KOH/g sample)=((Ep-B)*N*56.1)/Wt.

The acetyl, propionyl, and butyryl weight percents were determined by a hydrolysis GC method. In this method, about 1 g of ester is weighed into a weighing bottle and dried in a vacuum oven at 105° C. for at least 30 minutes. Then 0.500±0.001 g of sample was weighed into a 250 mL Erlenmyer flask. To this flask was added 50 mL of a solution of 9.16 g isovaleric acid, 99%, in 2000 mL pyridine. This mixture was heated to reflux for about 10 minutes after which 30 mL of methanolic potassium hydroxide solution was added. This mixture was heated at reflux for about 10 minutes. This mixture was allowed to cool with stirring for 20 minutes and then 3 mL of concentrated hydrochloric acid was added. The mixture was stirred for 5 minutes and then allowed to settle for 5 minutes. About 3 mL of solution was transferred to a centrifuge tube and centrifuged for about 5 minutes. The liquid was analyzed by GC (split injection and flame ionization detector) with a 25M×0.53 mm fused silica column with 1 micron FFAP phase. The weight percent acyl is calculated as follows where:

Ci=concentration of I(acyl group)

Fi=relative response factor for component I

Fs=relative response factor for isovaleric acid

Ai=area of component I

As=area of isovaleric acid

R=(grams of isovaleric acid)/(g sample)

Ci=((Fi*Ai)/Fs*As))*R*100

This GC method was used instead of NMR because the methylene of the carboxymethyl group cannot be separated from the ring protons of the cellulose backbone making absolute DS measurements by NMR impossible. The DS values were calculated by converting the acid number to percent carboxymethyl.

The cellulose acetate butyrates used were commercial samples from Eastman Chemical Company as follows: CAB 381-0.5 and CAB 551-0.2. The cellulose nitrate was RS 10-15 cP cellulose nitrate 70% in isopropanol which had been dried overnight in a 50° C. vacuum oven. Cargill 74-7455 alkyd resin and Cargill 52-7711 alkyd resin were obtained from Cargill, Inc. and were used as supplied (70% in butoxyethanol and 60% in toluene respectively). Desmondur HL was obtained from Bayer as a 60% solution in butyl acetate.

EXAMPLE 1

Carboxymethyl cellulose (Na salt form, approximately 0.26 DS carboxymethyl based on final product calculations) was converted to the free acid (CMC-H) by adding 100 grams of CMC(Na) to 3000 grams of 10% sulfuric acid. After 1 hour the fibrous sample was filtered free of excess liquids and washed with demineralized water. The protonated CMC was transferred to a glass fritted funnel and excess water removed to give 242 grams of water wet CMC(H) activate. The activate was dewatered by solvent exchange with three 200 gram portions of acetic acid and four 200 gram portions of butyric acid to give 235 grams of butyric acid wet CMC(H) activate. The activate was transferred to a 1 liter round bottom flask and chilled in ice for 1 hour. The activate was esterified by treating with 253 grams of butyric anhydride, 31 grams of acetic anhydride, and 3.44 grams of sulfuric acid at 0° C. The reaction was allowed to warm as a result of the exotherm and proceeded to dissolution after 2.25 hours at 43° C. (additional heat was required to hold the temperature at 43° C.). A solution of 95 grams of water and 95 grams of acetic acid was added dropwise to the reaction mixture over 30 minutes generating an exotherm of approximately 15° C. as a result of reaction of excess anhydride with water. The contents were hydrolyzed by heating to 72° C. for 3.5 hours. The sulfuric acid catalyst was then neutralized by the addition of 7.53 grams of magnesium acetate (tetrahydrate) in 25 grams of water and 25 grams of acetic acid. The reaction contents were diluted with an equal weight of acetic acid and precipitated by pouring into 2,750 grams of agitated water. The precipitated particles were hardened by the addition of 2,750 grams of water. The contents were filtered, washed with de-ionized water, and dried to obtain 125.5 grams of the protonated form of carboxymethyl cellulose acetate butyrate as a white granular powder: GC % acetyl 5.89, GC % butyryl 38.55%; acid number 47.11; PPM sulfur 83; absolute molecular weight 80,000; PM 95 IV 0.483. Calculation for DS gives; carboxymethyl 0.26, acetyl 0.43, butyryl 1.71, and hydroxyl 0.59.

EXAMPLE 2

A 2 L three-necked round-bottom flask (equipped with a mechanical stirrer, a thermometer, an addition funnel, a reflux condensor; agitation initially provided by periodically shaking flask, after dopeout a mechanical stirrer was used) heated and cooled with waterbath, was charged with butyric acid wet CMC (acid) (prepared from 180 g cellulose, generally total wt 500–600 g). To this solid was added a solution of 180 mL of butyric acid, 756 mL butyric anhydride, and 6.50 g of sulfuric acid. The reaction temperature was controlled between 30°–45° C. by placing flask in a 20°–25° C. water bath. After 30–60 minutes (when the temperature began to drop from the water jump), the temperature was raised to about 50° C. over about 1.5 hours. After a total reaction time of 3–6 hours, the material doped out to gel free solution. An "A final" of 1.17 g magnesium carbonate, 69 mL of butyric acid, and 88 mL of water was added over 20–30 minutes. At the end of the "A final" addition, a bleach solution of 0.36 g potassium permanganate, 10 mL of acetic acid, and 17 mL of water was added, and the bath was heated to about 80° C. over 2 hours. The reaction was maintained at 80° C. for 2 hours after which a solution of 2.34 g of magnesium carbonate, 29 mL of acetic acid, and 32 mL of water was added. This mixture was allowed to stir for 15–30 minutes at 80° C., and then filtered through a fine screen (filtered very fast with very little if any gels on screen). The filtered dope was precipitated in water in a bucket using an Omni Mixer for agitation. The precipitate was filtered in a bag filter and then washed with demineralized water for 8–10 hours. The resulting material was filtered to remove more water and then placed in a 60° C. vacuum oven to dry.

The typical analysis for material prepared in this manner follows:

IV (PM 95) 0.2–0.4

ODD_SOL-IV (0.25 g/100 mL DMSO) 0.2–0.40

ICP ppm Na<25 ppm Mg<50 ppm Ca<10 ppm S<100

GPC (NMP) Polystrene Standard

Mn 9,000–40,000

Mw 30,000–100,000

Mw/Mn 4–20

Acid Number 55–62 mg KOH/g sample
GC Wt %
  acetyl 1–2%
  butyryl 43–45%
DS based on the Acid Number and GC data
  acetyl 0.1–0.2
  butyryl 2.1–2.2
  CMC 0.35–0.39
  Total 2.55–2.79
Yield based on DS data above from cellulose 85–93%.

EXAMPLE 3

41 Grams of the acid form of carboxymethyl cellulose (DS 0.28 carboxymethyl based on final product calculations) was washed well with water. Excess water was removed by vacuum filtration followed by solvent exchange with three 200 gram portions of acetic acid and four 200 gram portions of propionic acid to give 130 grams of propionic acid wet CMC activate. The activate was chilled in an ice bath and then treated with a solution of 125 grams propionic anhydride and 1.72 grams of sulfuric acid at 0° C. This mixture was allowed to warm to 42° C. and esterified to dissolution after 2.5 hours (with additional heat added to maintain at 42° C.). A solution of 47.5 grams of propionic acid and 47.5 grams of water was added to the reaction mixture dropwise with stirring over 30 minutes. The carboxymethyl cellulose propionate was hydrolyzed by heating the resulting acid dope to 72° C. for 2 hours. The hydrolysis mixture was quenched by adding a solution of 3.75 grams magnesium acetate tetrahydrate in 10 grams of water and 10 grams of acetic acid. The reaction mixture was diluted with 375 grams of acetic acid and precipitated by pouring into 1400 grams of water with agitation. An additional 1400 grams of water was added followed by filtration, washing with de-ionized water and drying. Analysis as follows: acid number 48.58; GC % propionyl 46.2; ppm Sulfur 52; PM 95 IV 0,567; absolute molecular weight 103,000; DS based on gas chromatography and acid number are as follows: propionyl 2.65; carboxymethyl 0.28; hydroxyl 0.07.

The most highly preferred method for preparation of carboxy($C_1$–$C_3$ alkyl) cellulose esters of the invention is as follows:

1. Conversion of carboxy($C_1$–$C_3$ alkyl) cellulose-sodium salt to the acid form (here, carboxymethyl cellulose):

Carboxymethyl cellulose (Na Salt) was converted to the free acid by the addition of 100 grams of carboxymethyl cellulose to 16% aqueous sulfuric acid at 27°–30° C. The solids content of the resulting slurry was about 6%. The slurry was stirred for about 15 minutes and the acid solution was filtered to recover the converted CMC.

2. Activation of CMC (CMC-H):

CMC-H was washed in hot water (80° C.) with stirring for 1 hour. The water was drained to approximately 20% solids. The water-wet CMC was dewatered by washing 4 times with 444 grams of acetic acid followed by 4 washes with 444 grams of butyric acid. In between each wash the sample was drained to approximately 16–18% solids. After the final butyric acid wash, vacuum was applied to obtain the butyric acid wet CMC-H activate at 30–40% solids.

2. Esterification:

The butyric acid wet CMC-H was combined with 31 grams of acetic anhydride, and 253 grams of butyric anhydride at 0° C. A catalyst solution consisting of 3.44 grams of sulfuric acid in 3.44 grams of acetic acid was added slowly to the reaction mixture keeping the temperature below 30° C. After completion of the catalyst addition, the temperature was ramped from 30° C. to 35° C. over 150 minutes. The temperature was then ramped from 35° to 40° C. over a 60 minute period. The reaction mass was heated at 40° C. until complete dissolution of the solids to an acid dope.

4. Hydrolysis:

A solution of 95 grams of water and 95 grams of acetic acid was added to the acid dope over 30–45 minutes at 40°–45° C. thereby adjusting the water concentration to 13–14%. The temperature was increased to 70° C. and held for 2 hours. Then, 7.53 grams of magnesium acetate (tetrahydrate) in 25 grams of water and 25 grams of acetic acid was added to neutralize the strong acid catalyst.

5. Filtration:

The resulting dope was diluted with acetic acid and water to give about a 1:1 ratio of acetyl/butyryl and approximately 20% water concentration. The acid dope was held at 65° C. and circulated through a 0.5 micron filter to remove any particulates.

6. Precipitation:

The dope from above was added to water with agitation to give a flake precipitate. This material was allowed to harden, washed with 60° C. water, and dried at 60° C.

EXAMPLE 4

Solubility tests were performed by adding 1 part carboxymethyl cellulose ester to 9 part solvent. Carboxymethyl cellulose acetate butyrate (DS carboxymethyl 0.34, DS acetyl 0.22, DS butyryl 1.93, DS hydroxyl 0.49) was soluble in ethylene glycol monopropyl ether, ethylene glycol monobutyl ether, ethylene glycol monobutyl ether/water 80/20, ethylene glycol monobutyl ether/water 20/80, ethylene glycol mono-2-ethylhexyl ether, Hexyl Cellosolve (Union Carbide), diethylene glycol monomethyl ether, diethylene glycol monoethyl ether, diethylene glycol monopropyl ether, diethylene glycol monobutyl ether, propylene glycol monomethyl ether, methanol, methanol/water 90/10, ethyl alcohol, ethyl alcohol/water 80/20, propyl alcohol, propyl alcohol/water 80/20, isopropyl alcohol, isopropyl alcohol water 80/20, butyl alcohol, butyl alcohol/water 90/10, sec-butyl alcohol, sec-butyl alcohol/water 90/10, 2-ethylhexanol, Texanol ester alcohol (Eastman Chemical Co.), diacetone alcohol, ethylene glycol monobutyl ether acetate, diethylene glycol monoethyl ether, diethylene glycol monobutyl ether, propylene glycol monomethyl ether, acetone alcohol, ethylene glycol monobutyl ether acetate, diethylene glycol monoethyl ether acetate, diethylene glycol monobutyl ether acetate, acetone, acetone/water 80/20, methyl ethyl ketone, methyl propyl ketone, methyl isobutyl ketone, methyl amyl ketone, methyl isoamyl ketone, ethyl acetate, propyl acetate, isopropyl acetate, n-butyl acetate, isobutyl acetate, ethyl 3-ethoxypropionate, ethylene glycol diacetate, toluene/ethanol 80/20, and methylene chloride.

EXAMPLE 5

Solubility tests were performed by adding 1 part carboxymethyl cellulose ester to 9 parts solvent. Carboxymethyl cellulose acetate butyrate (CMCAB) (DS carboxymethyl 0.32, DS acetyl 0.74, DS butyryl 1.32, DS hydroxyl 0.62) was soluble in ethylene glycol monopropyl ether, ethylene glycol monobutyl ether, ethylene glycol monobutyl ether/water 80/20, Hexyl cellosolve (Union Carbide), diethylene glycol monomethyl ether, diethylene glycol monoethyl ether, diethylene glycol monopropyl ether, diethylene glycol monobutyl ether, propylene glycol monomethyl ether, methanol, methanol/water 90/10, methanol water 80/20, ethyl alcohol, ethyl alcohol/water 95/5, ethyl alcohol/water 75/25, propyl alcohol/water 80/20, butyl alcohol/water 90/10, isobutyl alcohol/water 90/10, Texanol ester alcohol, diacetone alcohol, ethylene glycol monobutyl ether acetate, diethylene glycol monoethyl ether acetate, diethylene glycol monobutyl ether acetate, propylene glycol monomethyl ether acetate, acetone, acetone/water 80/20, methyl ethyl ketone, methyl propyl ketone, methyl isopropyl ketone, methyl amyl ketone, methyl isoamyl ketone, cyclohexanone, ethyl acetate, propyl acetate, isopropyl acetate, n-butyl acetate, isobutyl acetate, ethyl 3-ethoxypropionate, ethylene glycol diacetate, toluene/ethanol 80/20, and methylene chloride.

EXAMPLE 6

Solubility tests were performed by adding 1 part carboxymethyl cellulose ester to 9 parts solvent. Carboxymethyl cellulose propionate (DS carboxymethyl 0.28, DS acetyl 0.01, DS propionyl 2.65, DS hydroxyl 0.06) was soluble in ethylene glycol monopropyl ether, ethylene glycol monobutyl ether, acetone, acetone/water 80/20, methyl isobutyl ketone, methyl amyl ketone, ethyl acetate, n-butyl acetate, toluene/ethanol 80/20, methylene chloride, methylene chloride/methanol 90/10, and EE acetate glycol ether.

Formulations

EXAMPLE 7

Thermoplastic Wood Topcoat

A dispersion of carboxymethyl cellulose acetate butyrate (CMCAB) was prepared from a solution of 24.25 grams of a solvent blend consisting of 1/1/2 ethylene glycol monobutyl ether/ethylene glycol monopropyl ether/ethyl 3-ethoxypropionate, 6.06 grams of water, 0.2 grams of Ethomid HT60 (ethoxylated amides, Akzo), 1.90 grams of 2-dimethylaminoethanol, and 20.00 grams of CMCAB (acid number 58 carboxymethyl DS 0.34, acetyl DS 0.22, butyryl DS 1.93, hydroxyl DS 0.51), by adding to 47.56 grams of water with stirring. The wood topcoat formulation was prepared by adding 20 grams of this dispersion, 26.67 grams of water and 53.33 grams of Carboset XL-511 (B. F. Goodrich) 30% solids acrylic dispersion. This formulation gave a total solids of 20.01%, total solvent of 5.23%, and total water of 74.76% for a total VOC of 1.7 lb/gal. The pH was adjusted to 8.0 with ammonia and the solids were further reduced with water to the desired spray viscosity (resulting solids were approximately 16%).

EXAMPLE 8

Pigmented Thermoplastic Automotive Basecoat

A solution of 24.25 grams of a solvent blend of 1/1/2 ethylene glycol monobutyl ether/ethylene glycol monopropyl ether/ethyl 3-ethoxypropionate, 6.06 grams of water, 0.20 grams of Ethomid HT60 (ethoxylated amides, Akzo), 20 grams of CMCAB (acid number 58, carboxymethyl DS 0.34, acetyl DS 0.22, butyryl DS 1.93, hydroxyl DS 0.51), and 1.9 grams of 2-dimethylaminoethanol was dispersed by adding with stirring to 47.59 grams of water. A basecoat formulation was prepared from 17.60 grams of this CMCAB dispersion, 3.7 grams of aluminum flake (Pigment, Siberline Aqua Paste 5245-AR-305, 65% solids in mineral oil), 31.77 grams of water, and 46.93 grams of Carboset XL-511, 30% solids acrylic dispersion (BF Goodrich). This formulation gave 20.01% solids, 5.90% solvent and 74.09% water and a total VOC of 1.9 lb per gallon.

EXAMPLE 9

Waterborne dispersions were prepared as in example 85 at varying weight % concentrations of the CMCAB. Viscosity measurements were obtained using a Brookfield Viscometer Spindle 2 at 6 RPM. The viscosity build was observed by increasing the CMC ester concentration from 2 to 3.5%, as shown below.

| Weight % CMCAB | Viscosity, cP |
|---|---|
| 2.0 | 21 |
| 2.5 | 1100 |
| 3.0 | 3300 |
| 3.5 | 100000 |

Since CMCAB could be used as a rheology modifier at low concentrations (about 2 weight percent), the viscosity increase on evaporation of some of the water during a spraying operation could help prevent sagging of the coating.

EXAMPLE 10

A dispersion was prepared by pouring 341.6 grams of Carboset XL11 acrylic dispersion (B. F. Goodrich) and 23.7 grams of water to a stirred solution of 34.2 grams of carboxymethyl cellulose acetate butyrate (DS carboxymethyl 0.35, DS acetyl 0.13, DS butyryl 2.16, DS hydroxyl 0.36) in 40 grams of ethylene glycol monobutyl ether and 40 grams ethyl 3-ethoxypropionate. This dispersion (100 grams) was mixed with 12.3 grams of Aquavex 504–107P (Siberline aluminum flake) and 23.3 grams of water to make a waterborne basecoat which was sprayed onto phosphate treated steel panels. After drying, an acrylic/melamine clear coat was applied and cured at 130° Celsius for 30 minutes.

EXAMPLE 11

A waterborne dispersion of CMC butyrate (acid number 119, carboxymethyl DS 0.74, acetyl DS 0.04, butyryl DS 1.99) was prepared as follows: 39 grams of the CMC butyrate was dissolved in 160 ml of butoxyethanol and treated with 11.5 ml of triethylamine (approximately 0.5 equivalents based on acid number) followed by 400 ml of water. This resulted in a colloidal CMC butyrate dispersion for which further addition of water did not precipitate the CMC butyrate.

EXAMPLES 12–56

Compatibility (Film Clarity) Alkyd and Polyisocyanate Resins from Organic Solvents Solutions were prepared using ratios of cellulosic to modifying resin of 1/9, 1/3, 1/1, and 3/1 at 20% solids in methyl isobutyl ketone (MIBK). These mixtures were allowed to mix overnight by rolling. If the resulting solutions were not clear, isopropyl alcohol was added to make the solvent system 90/10 MIBK/isopropyl alcohol and the mixtures rolled for an additional 2 hours. The solutions were then evaluated visually for clarity, the presence of gels, fibers, etc. (Tables 1, 3, and 5).

Films were cast on glass from the solutions using a 20 mil draw-down cup. The films were allowed to air dry for 24 hours. The resulting films were evaluated visually both with room lighting and with a high intensity light source (Tables 2, 4, and 6) for film clarity.

TABLE 1

SOLUTION CHARACTERISTICS OF CARGILL 74-7455 ALKYD AND CELLULOSICS

| Example | Cellulosic | Acid # | Ac DS | Bu DS | Tot. DS | Cell/MOD 1/0 | Cell/MOD 1/9 | Cell/MOD 1/3 | Cell/MOD 1/1 | Cell/MOD 3/1 |
|---|---|---|---|---|---|---|---|---|---|---|
| 12 | NC RS 10-15 cP | — | | | | SH | C | C | C | C |
| 13 | CAB 381-0.5 | — | 0.92 | 1.87 | 2.79 | C | C | C | C | CA |
| 14 | CAB 551-0.2 | — | 0.06 | 2.58 | 2.64 | C | C | C | C | CA |
| 15 | CMCAB | 60 | 0.28 | 2.35 | 3.02 | CFA | C | C | C | C |
| 16 | CMCAB | 68 | 0.69 | 1.75 | 2.85 | HA | C | CA | SHA | HA |
| 17 | CMCB | 69 | 0.13 | 2.16 | 2.71 | C | C | C | C | C |
| 18 | CMCAB | 59 | 0.22 | 1.93 | 2.49 | N | C | C | C | C |
| 19 | CMCAB | 88 | 0.29 | 2.07 | 2.92 | C | C | C | C | C |
| 20 | CMCAB | 88 | 0.24 | 1.95 | 2.73 | SHA | C | SH | SH | H |
| 21 | CMCAB | 86 | 0.18 | 1.77 | 2.45 | C | C | C | C | C |
| 22 | CMCAB | 91 | 1.00 | 1.28 | 2.81 | C | C | C | C | C |
| 23 | CMCB | 128 | 0.04 | 2.05 | 2.90 | CFA | C | C | C | C |
| 24 | CMCB | 125 | 0.17 | 1.73 | 2.65 | N | C | C | SH | SH |
| 25 | CMCB | 125 | 0.02 | 1.62 | 2.35 | CFA | C | C | C | C |
| 26 | CMCB | 131 | 0.83 | 1.20 | 2.80 | CFA | C | CF | CF | CFA |

G - EITHER CONTAINS GELS OR TOTALLY GELLED
A - ISOPROPYL ALCOHOL ADDED TO TRY TO CLEAR UP SOLUTION
F - FIBERS PRESENT
P - SEPARATED INTO TWO LIQUID PHASES
C - CLEAR SOLUTION
SH - SLIGHT HAZE
H - HAZY
I - INSOLUBLES PRESENT (NOT FIBERS OR GELS)
Y - YELLOW COLOR
N - INSUFFICIENT CELLULOSIC FOR TESTING

TABLE 2

FILM CHARACTERISTICS OF CARGILL 74-7455 ALKYD AND CELLULOSICS

| Example | Cellulosic | Acid # | Ac DS | Bu DS | Tot. DS | Cell/MOD 1/0 | Cell/MOD 1/9 | Cell/MOD 1/3 | Cell/MOD 1/1 | Cell/MOD 3/1 |
|---|---|---|---|---|---|---|---|---|---|---|
| 12 | NC RS 10-15 cP | — | | | | 10 | 10 | 10 | 10 | 9 |
| 13 | CAB 381-0.5 | — | 0.92 | 1.87 | 2.79 | 10 | 5 | 5 | 5 | 5 |
| 14 | CAB 551-0.2 | — | 0.06 | 2.58 | 2.64 | 10 | 5 | 5 | 5 | 5 |
| 15 | CMCAB | 60 | 0.28 | 2.35 | 3.02 | 10 | 6 | 5 | 5 | 7 |
| 16 | CMCAB | 68 | 0.69 | 1.75 | 2.85 | 9 | 7 | 5 | 5 | 5 |
| 17 | CMCB | 69 | 0.13 | 2.16 | 2.71 | 10 | 8 | 7 | 7 | 7 |
| 18 | CMCAB | 59 | 0.22 | 1.93 | 2.49 | N | 9 | 7 | 7 | 8 |
| 19 | CMCAB | 88 | 0.29 | 2.07 | 2.92 | 10 | 9 | 8 | 8 | 9 |
| 20 | CMCAB | 88 | 0.24 | 1.95 | 2.73 | 10 | 9 | 6 | 7 | 8 |
| 21 | CMCAB | 86 | 0.18 | 1.77 | 2.45 | 10C | 10 | 9 | 9 | 9 |
| 22 | CMCAB | 91 | 1.00 | 1.28 | 2.81 | 10 | 7 | 6 | 7 | 8 |
| 23 | CMCB | 128 | 0.04 | 2.05 | 2.90 | 10 | 10 | 9 | 10 | 10 |
| 24 | CMCB | 125 | 0.17 | 1.73 | 2.65 | N | 10 | 9 | 9 | 10 |
| 25 | CMCB | 125 | 0.02 | 1.62 | 2.35 | 10 | 10 | 9 | 8 | 10 |
| 26 | CMCAB | 131 | 0.83 | 1.20 | 2.80 | 10 | 9 | 7 | 7 | 10 |

10 - CLEAR UNDER HIGH INTENSITY LIGHT
N - INSUFFICIENT CELLULOSIC FOR TESTING
9 - SLIGHT RAZE UNDER HIGH INTENSITY LIGHT
8 - HAZY UNDER HIGH INTENSITY LIGHT BUT CLEAR IN ROOM LIGHT
7 - SLIGHT HAZE UNDER ROOM LIGHT
5,6 - VERY HAZY UNDER ROOM LIGHT
<5 - OPAQUE
C - FILM CRACKED
— NO FILM CAST

TABLE 3

SOLUTION CHARACTERISTICS OF CARGILL 52-7711 ALKYD AND CELLULOSICS

| Example | Cellulosic | Acid # | Ac DS | Bu DS | Tot. DS | Cell/ MOD 1/0 | Cell/ MOD 1/9 | Cell/ MOD 1/3 | Cell/ MOD 1/1 | Cell/ MOD 3/1 |
|---|---|---|---|---|---|---|---|---|---|---|
| 27 | NC RS 10-15 cP | — | | | | SH | C | C | C | C |
| 28 | CAB 381-0.5 | — | 0.92 | 1.87 | 2.79 | C | C | C | SH | SH |
| 29 | CAB 551-0.2 | — | 0.06 | 2.58 | 2.64 | C | C | C | C | HA |
| 30 | CMCAB | 60 | 0.28 | 2.35 | 3.02 | CFA | C | C | C | C |
| 31 | CMCAB | 68 | 0.69 | 1.75 | 2.85 | HA | C | SHA | SHA | HA |
| 32 | CMCB | 69 | 0.13 | 2.16 | 2.71 | C | C | C | C | C |
| 33 | CMCAB | 59 | 0.22 | 1.93 | 2.49 | N | C | C | C | C |
| 34 | CMCAB | 88 | 0.29 | 2.07 | 2.92 | C | C | C | C | C |
| 35 | CMCAB | 88 | 0.24 | 1.95 | 2.73 | SHA | C | SH | SH | H |
| 36 | CMCAB | 86 | 0.18 | 1.77 | 2.45 | C | C | C | C | C |
| 37 | CMCAB | 01 | 1.00 | 1.28 | 2.81 | C | C | C | C | C |
| 38 | CMCB | 128 | 0.04 | 2.05 | 2.90 | CFA | C | C | C | C |
| 39 | CMCAB | 125 | 0.17 | 1.73 | 2.65 | N | C | C | C | C |
| 40 | CMCB | 125 | 0.02 | 1.62 | 2.35 | CFA | CP | P | P | P |
| 41 | CMCAB | 131 | 0.83 | 1.62 | 2.80 | CFA | CF | CF | CF | CF |

G - EITHER CONTAINS GELS OR TOTALLY GELLED
A - ISOPROPYL ALCOHOL ADDED TO TRY TO CLEAR UP SOLUTION
F - FIBERS PRESENT
P - SEPARATED INTO TWO LIQUID PHASES
C - CLEAR SOLUTION
SH - SLIGHT HAZE
H - HAZY
I - INSOLUBLES PRESENT (NOT FIBERS OR GELS)
Y - YELLOW COLOR
N - INSUFFICIENT CELLULOSIC FOR TESTING

TABLE 4

FILM CHARACTERISTICS OF CARGILL 57-7711 ALKYD AND CELLULOSICS

| Example | Cellulosic | Acid # | Ac DS | Bu DS | Tot. DS | Cell/ MOD 1/0 | Cell/ MOD 1/9 | Cell/ MOD 1/3 | Cell/ MOD 1/1 | Cell/ MOD 3/1 |
|---|---|---|---|---|---|---|---|---|---|---|
| 27 | NC RS 10-15 cP | — | | | | 10 | 10 | 10 | 10 | 10 |
| 28 | CAB 381-0.5 | — | 0.92 | 1.87 | 2.79 | 10 | 6 | 5 | 5 | 5 |
| 29 | CAB 551-0.2 | — | 0.06 | 2.58 | 2.64 | 10 | 5 | 5 | 5 | 5 |
| 30 | CMCAB | 60 | 0.28 | 2.35 | 3.02 | 10 | 8 | 8 | 6 | 7 |
| 31 | CMCAB | 68 | 0.69 | 1.75 | 2.85 | 9 | 10 | 9 | 7 | 8 |
| 32 | CMCB | 69 | 0.13 | 2.16 | 2.71 | 10 | 10 | 10 | 9 | 8 |
| 33 | CMCAB | 59 | 0.22 | 1.93 | 2.49 | N | 9 | 7 | 7 | 7 |
| 34 | CMCAB | 88 | 0.29 | 2.07 | 2.92 | 10 | 10 | 10 | 9 | 9 |
| 35 | CMCAB | 88 | 0.24 | 1.95 | 2.73 | 10 | 8 | 7 | 7 | 8 |
| 36 | CMCAB | 86 | 0.18 | 1.77 | 2.45 | 10C | 10 | 10 | 9 | 9 |
| 37 | CMCAB | 91 | 1.00 | 1.28 | 2.81 | 10 | 10 | 7 | 7 | 8 |
| 38 | CMCB | 128 | 0.04 | 2.05 | 2.90 | 10 | 10 | 8 | 8 | 9 |
| 39 | CMCAB | 125 | 0.17 | 1.73 | 2.65 | N | 10 | 9 | 9 | 8 |
| 40 | CMCB | 125 | 0.02 | 1.62 | 2.35 | 10 | 10 | — | — | — |
| 41 | CMCAB | 131 | 0.83 | 1.20 | 2.80 | 10 | 8 | 6 | 6 | 7 |

10 - CLEAR UNDER HIGH INTENSITY LIGHT
N - INSUFFICIENT CELLULOSIC FOR TESTING
9 - SLIGHT RAZE UNDER HIGH INTENSITY LIGHT
8 - HAZY UNDER HIGH INTENSITY LIGHT BUT CLEAR IN ROOM LIGHT
7 - SLIGHT HAZE UNDER ROOM LIGHT
5,6 - VERY HAZY UNDER ROOM LIGHT
<5 - OPAQUE
C - FILM CRACKED
— NO FILM CAST

TABLE 5

SOLUTION CHARACTERISTICS OF DESMONDUR HL AND CELLULOSICS

| Example | Cellulosic | Acid # | Ac DS | Bu DS | Tot. DS | Cell/ MOD 1/0 | Cell/ MOD 1/9 | Cell/ MOD 1/3 | Cell/ MOD 1/1 | Cell/ MOD 3/1 |
|---|---|---|---|---|---|---|---|---|---|---|
| 42 | NC RS 10-15 cP | — | | | | SH | C | CY | CY | I |
| 43 | CAB 381-0.5 | — | 0.02 | 1.87 | 2.79 | C | C | C | I | I |
| 44 | CAB 551-0.2 | — | 0.06 | 2.58 | 2.64 | C | C | C | I | I |
| 45 | CMCAB | 45 | 0.39 | 1.94 | 2.60 | C | C | SH | G | G |
| 46 | CMCAB | 60 | 0.28 | 2.35 | 3.02 | CFA | C | CG | G | G |
| 47 | CMCAB | 68 | 0.69 | 1.75 | 2.85 | HA | C | SH | G | G |
| 48 | CMCB | 69 | 0.13 | 2.16 | 2.71 | C | C | C | G | G |
| 49 | CMCAB | 59 | 0.22 | 1.93 | 2.49 | N | C | C | G | G |
| 50 | CMCAB | 88 | 0.29 | 2.07 | 2.92 | C | C | CG | G | G |
| 51 | CMCAB | 88 | 0.24 | 1.95 | 2.73 | SHA | CFG | G | G | G |
| 52 | CMCAB | 86 | 0.18 | 1.77 | 2.45 | C | CG | G | G | G |
| 53 | CMCAB | 91 | 1.00 | 1.28 | 2.81 | C | C | G | G | G |
| 54 | CMCB | 128 | 0.04 | 2.05 | 2.90 | CFA | CG | G | G | G |
| 55 | CMCB | 125 | 0.02 | 1.62 | 2.35 | CFA | HG | G | G | G |
| 56 | CMCAB | 131 | 0.83 | 1.20 | 2.80 | CFA | G | G | G | G |

G - EITHER CONTAINS GELS OR TOTALLY GELLED
A - ISOPROPYL ALCOHOL ADDED TO TRY TO CLEAR UP SOLUTION
F - FIBERS PRESENT
P - SEPARATED INTO TWO LIQUID PHASES
C - CLEAR SOLUTION
SH - SLIGHT HAZE
H - HAZY
I - INSOLUBLES PRESENT (NOT FIBERS OR GELS)
Y - YELLOW COLOR
N - INSUFFICIENT CELLULOSIC FOR TESTING

TABLE 6

FILM CHARACTERISTICS OF DESMONDUR HL AND CELLULOSICS

| Example | Cellulosic | Acid # | Ac DS | Bu DS | Tot. DS | Cell/ MOD 1/0 | Cell/ MOD 1/9 | Cell/ MOD 1/3 | Cell/ MOD 1/1 | Cell/ MOD 3/1 |
|---|---|---|---|---|---|---|---|---|---|---|
| 42 | NC RS 10-15 cP | — | | | | 10 | 10C | 10C | 10C | — |
| 43 | CAB 381-0.5 | — | 0.92 | 1.87 | 2.79 | 10 | 5C | 5C | — | — |
| 44 | CAB 551-0.2 | — | 0.06 | 2.58 | 2.64 | 10 | 5C | 5C | — | — |
| 45 | CMCAB | 45 | 0.39 | 1.94 | 2.60 | 10 | 10 | 10C | — | — |
| 46 | CMCAB | 60 | 0.28 | 2.35 | 3.02 | 10 | 5C | 5C | — | — |
| 47 | CMCAB | 68 | 0.69 | 1.75 | 2.85 | 9 | 10C | 10C | — | — |
| 48 | CMCB | 69 | 0.13 | 2.16 | 2.71 | 10 | 10C | 10C | — | — |
| 49 | CMCAB | 59 | 0.22 | 1.93 | 2.49 | N | 10C | 10C | — | — |
| 50 | CMCAB | 88 | 0.29 | 2.07 | 2.93 | 10 | 10C | 10C | — | — |
| 51 | CMCAB | 88 | 0.24 | 1.95 | 2.73 | 10 | 10C | — | — | — |
| 52 | CMCAB | 86 | 0.18 | 1.77 | 2.45 | 10C | 10C | — | — | — |
| 53 | CMCAB | 91 | 1.00 | 1.28 | 2.81 | 10 | 8C | — | — | — |
| 54 | CMCB | 128 | 0.04 | 2.05 | 2.90 | 10 | 10C | — | — | — |
| 55 | CMCB | 125 | 0.02 | 1.62 | 2.35 | 10 | — | — | — | — |
| 56 | CMCAB | 131 | 0.83 | 1.20 | 2.80 | 10 | — | — | — | — |

10 - CLEAR UNDER HIGH INTENSITY LIGHT
9 - SLIGHT RAZE UNDER HIGH INTENSITY LIGHT
8 - HAZY UNDER HIGH INTENSITY LIGHT BUT CLEAR IN ROOM LIGHT
7 - SLIGHT HAZE UNDER ROOM LIGHT
5,6 - VERY HAZY UNDER ROOM LIGHT
<5 - OPAQUE
C - FILM CRACKED
— NO FILM CAST
N - INSUFFICIENT CELLULOSIC FOR TESTING

We claim:

1. Carboxymethyl cellulose butyrate having a degree of substitution per anhydroglucose unit of carboxymethyl of 0.20 to 0.75, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 0.70 dL/g, as measured in a 60/40 (wt./wt.) solution of phenol/tetrachloroethane at 25° C.

2. The carboxymethyl cellulose butyrate of claim 1, wherein the inherent viscosity is 0.35 to 0.60 dL/g.

3. Carboxymethyl cellulose propionate having a degree of substitution per anhydroglucose unit of carboxymethyl of 0.20 to 0.75, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 0.70 dL/g, as measured in a 60/40 (wt./wt.) solution of phenol/tetrachloroethane at 25° C.

4. The carboxymethyl cellulose propionate of claim 2, wherein the inherent viscosity is 0.35 to 0.60 dL/g.

5. Carboxymethyl cellulose acetate butyrate having a degree of substitution of carboxymethyl of 0.20 to 0.75, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65, and having an inherent viscosity of 0.20 to 0.70 dL/g, as measured in a 60/40 (wt./wt.) solution of phenol/tetrachloroethane at 25° C.

6. The carboxymethyl cellulose acetate butyrate of claim 5, wherein the degree of substitution per anhydroglucose unit of hydroxyl is 0.10 to 0.70, butyryl is 1.10 to 2.55, and acetyl is 0.10 to 0.90.

7. Carboxymethyl cellulose acetate propionate having a degree of substitution per anhydroglucose unit of carboxymethyl of 0.20 to 0.75, a degree of substitution per anhydroglucose unit of hydroxyl from about 0.10 to 0.70, a degree of substitution per anhydroglucose unit of propionyl of about 0.10 to 2.60 and a degree of substitution per anhydroglucose unit of acetyl of about 0.10 to 2.65, and having an inherent viscosity of 0.20 to 0.70 dL/g, as measured in a 60/40 (wt./wt.) solution of phenol/tetrachloroethane at 25° C.

8. The carboxymethyl cellulose acetate propionate of claim 7, wherein the degree of substitution per anhydroglucose unit of hydroxyl is 0.10 to 0.70, butyryl is 1.10 to 2.55, and acetyl is 0.10 to 0.90.

9. A coating composition comprising
   (a) about 0.1 to about 50 weight percent, based on the total weight (a) and (b) in said composition, of a $C_2$–$C_4$ ester of carboxy($C_1$–$C_3$)alkylcellulose, an inherent viscosity of about 0.20 to 0.70 dL/g, as measured in a 60/40 (wt./wt.) solution of phenol/tetra-chloroethane at 25° C., a degree of substitution per anhydroglucose unit of carboxy($C_1$–$C_3$)alkyl of greater than 0.2 to about 0.75, and a degree of substitution per anhydroglucose unit of $C_2$–$C_4$ esters of about 1.5 to about 2.70;
   (b) about 0.1 to 50 weight percent, based on the total weight of (a) and (b) in said composition, of a resin selected from the group consisting of polyesters, polyester-amides, cellulose esters, alkyds, polyurethanes, epoxy resins, polyamides, acrylics, vinyl polymers, polyisocyanates, and melamines; and
   (c) an organic solvent or solvent mixture;
wherein the total weight of (a) and (b) is about 5 to 70 weight percent of the total weight of (a), (b), and (c).

10. The coating composition of claim 9, further comprising about 0.1 to about 15 weight percent, based on the total weight of the composition, of one or more coatings additives selected from the group consisting of leveling, rheology, and flow control agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

11. The coating composition of claim 9, wherein the inherent viscosity of the $C_2$–$C_4$ ester of carboxy($C_1$–$C_3$) alkyl cellulose is 0.35 to 0.60.

12. The coating composition of claim 9, wherein the carboxy($C_1$–$C_3$)alkyl cellulose degree of substitution per anhydroglucose unit of the $C_2$–$C_4$ ester of carboxy($C_1$–$C_3$) alkyl cellulose is 0.25 to 0.35.

13. The coating composition of claim 9, wherein the carboxy($C_1$–$C_3$)alkyl cellulose is carboxymethyl cellulose.

14. The coating composition of claim 9, wherein the $C_2$–$C_4$ ester of carboxy($C_1$–$C_3$)alkyl cellulose is selected from the group consisting of
   a) carboxymethylcellulose butyrate having a degree of substitution per anhydroglucose unit of carboxymethyl of 0.20 to 0.35, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 0.70 dL/g, as measured in a 60/40 (wt./wt.) solution of phenol/tetrachloroethane at 25° C.;
   b) carboxymethyl cellulose propionate having a degree of substitution per anhydroglucose unit of carboxymethyl of 0.20 to 0.35, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 0.70 dL/g, as measured in a 60/40 (wt./wt.) solution of phenol/tetrachloroethane at 25° C;
   c) carboxymethyl cellulose acetate butyrate having a degree of substitution of carboxymethyl of 0.20 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65; and
   d) carboxymethyl cellulose acetate propionate having a degree of substitution per anhydroglucose unit of carboxymethyl of 0.20 to 0.35, a degree of substitution per anhydroglucose unit of hydroxyl from about 0.10 to 0.70, and a degree of substitution per anhydroglucose unit of propionyl of about 0.10 to 2.60 and a degree of substitution per anhydroglucose unit of acetyl of about 0.10 to 2.65.

15. The coating composition of claim 9, wherein the $C_2$–$C_4$ ester of carboxy($C_1$–$C_3$)alkylcellulose is carboxymethylcellulose acetate butyrate having a degree of substitution of carboxymethyl of 0.20 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65.

16. The coating composition of claim 9, further comprising one or more fillers and/or pigments.

17. The coating composition of claim 16, wherein the pigment is comprised of aluminum or mica.

18. A waterborne coating composition comprising
   (a) about 0.1 to about 50 weight percent, based on the total weight of (a) and (b), of a $C_2$–$C_4$ ester of carboxy ($C_1$–$C_3$)alkylcellulose, an inherent viscosity of about 0.20 to 0.70 dL/g, as measured in a 60/40 (wt./wt.) solution of phenol/tetra-chloroethane at 25° C., a degree of substitution per anhydroglucose unit of carboxy($C_1$–$C_3$)alkyl of greater than about 0.20 to about 0.75, and a degree of substitution per anhydroglucose unit of $C_2$–$C_4$ esters of about 1.50 to about 2.70; wherein at least about 25 percent of all free carboxyl groups on said $C_2$–$C_4$ ester of carboxy($C_1$–$C_3$) alkylcellulose have been neutralized with ammonia or an amine;
   (b) at least 50 weight percent, based on the total weight of (a) and (b), of a compatible water soluble or water dispersible resin selected from the group consisting of polyesters, polyester-amides, cellulose esters, alkyds, polyurethanes, epoxy resins, polyamides, acrylics, vinyl polymers, polyurethanes, and melamines;
   (c) water;
   (d) an organic solvent;
wherein the total weight of (a) and (b) is between 5 and 50 weight percent of the total composition and the organic solvent comprises less than 20 weight percent of the total weight of the composition.

19. The coating composition of claim 18, further comprising about 0.1 to about 15 weight percent, based on the total weight of the composition, of one or more coatings additives selected from the group consisting of leveling, rheology, and flow control agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

20. The coating composition of claim 18, wherein the inherent viscosity of the $C_2$–$C_4$ ester of carboxy($C_1$–$C_3$) alkyl cellulose is 0.35 to 0.60.

21. The coating composition of claim 18, wherein the carboxy($C_1$–$C_3$)alkyl degree of substitution per anhydroglucose unit of the $C_2$–$C_4$ ester of carboxy($C_1$–$C_3$)alkyl cellulose is 0.20 to 0.35.

22. The coating composition of claim 18, wherein the carboxy($C_1$–$C_3$)alkyl cellulose is carboxymethyl cellulose.

23. The coating composition of claim 18, further comprising sufficient ammonia or amines to raise the pH of the composition to a pH of 7 to 9.

24. The coating composition of claim 18, wherein the $C_2$–$C_4$ ester of carboxy($C_1$–$C_3$)alkyl cellulose is selected from the group consisting of
   a) carboxymethyl cellulose butyrate having a degree of substitution per anhydroglucose unit of carboxymethyl of 0.20 to 0.35, a degree of substitution per anhydroglucose unit of hydroxyl from about 0.10 to 0.70, and a degree of substitution per anhydroglucose unit of butyryl of about 1.50 to 2.70, and having an inherent viscosity of 0.20 to 0.70 dL/g, as measured in a 60/40 (wt./wt.) solution of phenol/tetrachloroethane at 25° C.;
   b) carboxymethyl cellulose propionate having a degree of substitution per anhydroglucose unit of carboxymethyl of 0.20 to 0.35, a degree of substitution per anhydroglucose unit of hydroxyl from about 0.10 to 0.70, and a degree of substitution per anhydroglucose unit of propionyl of about 1.50 to 2.70, and having an inherent viscosity of 0.20 to 0.70 dL/g, as measured in a 60/40 (wt./wt.) solution of phenol/tetrachloroethane at 25° C.;
   c) carboxymethyl cellulose acetate butyrate having a degree of substitution of carboxymethyl of 0.20 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65; and
   d) carboxymethyl cellulose acetate propionate having a degree of substitution per anhydroglucose unit of carboxymethyl of 0.20 to 0.35, a degree of substitution per anhydroglucose unit of hydroxyl from about 0.10 to 0.70, and a degree of substitution per anhydroglucose unit of propionyl of about 0.10 to 2.60 and a degree of substitution per anhydroglucose unit of acetyl of about 0.10 to 2.65.

25. The coating composition of claim 18, wherein the $C_2$–$C_4$ ester of carboxy($C_1$–$C_3$)alkyl cellulose is carboxymethyl cellulose acetate butyrate having a degree of substitution of carboxymethyl of 0.20 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65.

26. The coating composition of claim 18, further comprising one or more fillers and/or pigments.

27. The coating composition of claim 26, wherein the pigment is comprised of aluminum or mica.

28. A shaped or formed article coated with the composition of claim 9.

29. A shaped or formed article coated with the composition of claim 18.

30. A pigment dispersion comprising about 20 to 50 weight percent by weight of a pigment and correspondingly about 50 to 80 percent by weight of a $C_2$–$C_4$ ester of carboxy($C_1$–$C_3$)alkyl cellulose having an inherent viscosity of about 0.2 to 0.70 dL/g, as measured in a 60/40 (wt./wt.) solution of phenol/tetrachloroethane at 25° C., a degree of substitution per anhydroglucose unit of carboxy($C_1$–$C_3$) alkyl of about 0.2 to about 0.70, and a degree of substitution per anhydroglucose unit of $C_2$–$C_4$ esters of about 1.5 to about 2.7.

31. The pigment dispersion of claim 30, wherein the pigment is comprised of aluminum or mica.

* * * * *